US011339845B1

(12) United States Patent
Walsh et al.

(10) Patent No.: US 11,339,845 B1
(45) Date of Patent: May 24, 2022

(54) TOTAL-INTERNAL REFLECTION ELASTIC METASURFACES: DESIGN AND APPLICATION

(71) Applicants: National Technology & Engineering Solutions of Sandia, LLC, Albuquerque, NM (US); Fabio Semperlotti, West Lafayette, IN (US); Hongfei Zhu, West Lafayette, IN (US)

(72) Inventors: Timothy Walsh, West Lafayette, IN (US); Fabio Semperlotti, West Lafayette, IN (US); Hongfei Zhu, West Lafayette, IN (US)

(73) Assignees: National Technology & Engineering Solutions of Sandia, LLC, Albuquerque, NM (US); Purdue Research Foundation, West Lafayette, IN (US)

( * ) Notice: Subject to any disclaimer, the term of this patent is extended or adjusted under 35 U.S.C. 154(b) by 564 days.

(21) Appl. No.: 16/413,441

(22) Filed: May 15, 2019

(51) Int. Cl.
*F16F 9/30* (2006.01)
*G10K 11/168* (2006.01)

(52) U.S. Cl.
CPC ............ *F16F 9/306* (2013.01); *G10K 11/168* (2013.01)

(58) Field of Classification Search
CPC ........... G10K 11/168; F16F 9/30; F16F 9/306
See application file for complete search history.

(56) References Cited

U.S. PATENT DOCUMENTS

| 9,390,702 | B2 * | 7/2016 | Mathur | G10K 11/162 |
| 11,120,783 | B2 * | 9/2021 | Pack | B32B 3/30 |
| 11,131,360 | B2 * | 9/2021 | Shrinkle | F16F 15/04 |
| 2013/0043091 | A1 * | 2/2013 | Wheeler | F16F 1/00 |
| | | | | 181/294 |

FOREIGN PATENT DOCUMENTS

WO WO-2017096064 A1 * 6/2017 ........... G10K 11/168

OTHER PUBLICATIONS

Yu et al., "Light Propagation with Phase Discontinuities: Generalized Laws of Reflection and Refraction," Science, vol. 334, Oct. 21, 2011, pp. 333-337.
Ni et al., "Broadband Light Bending with Plasmonic Nanoantennas," Science, vol. 335, Jan. 27, 2012, p. 427.
(Continued)

*Primary Examiner* — Forrest M Phillips
(74) *Attorney, Agent, or Firm* — Yee & Associates, P.C.

(57) ABSTRACT

An acoustic shield for protecting a vibrational sensitive device includes a first unit cell and a second unit cell. The first unit cell includes a first locally resonant unit. The first locally resonant unit controls a first phase gradient and the first unit cell includes a first surface. The second unit cell includes a second surface proximate to the first surface. The second unit cell includes a second locally resonant unit embedded along the second interface. The second locally resonant unit controls a second phase gradient. The first phase gradient is different from the second phase gradient. The first unit cell and the second unit cell comprise a super cell. The acoustic shield is configured such that a vibrational wave from a first side of the super cell to a second side of the super cell is substantially attenuated.

20 Claims, 7 Drawing Sheets

(56) References Cited

OTHER PUBLICATIONS

Grady et al., "Terahertz Metamaterials for Linear Polarization Conversion and Anomalous Refraction," Science, vol. 340, Jun. 14, 2013, pp. 1304-1307.

Pfeiffer et al., "Metamaterial Huygens' Surfaces: Tailoring Wave Fronts with Reflectionless Sheets," Physical Review Letters, vol. 110, 2013, pp. 197401-1-197401-5.

Aieta et al., "Aberration-Free Ultrathin Flat Lenses and Axicons at Telecom Wavelengths Based on Plasmonic Metasurfaces," Nano Letters, 12, 2012, pp. 4932-4936.

Kang et al., "Wave Front Engineering From an Array of Thin Aperture Antennas," Optics Express, vol. 20, No. 14, 2012, pp. 15882-15890.

Sun et al., "Gradient-Index Meta-Surfaces as a Bridge Linking Propagating Waves and Surface Waves," Nature Materials, vol. 11, 2012, pp. 426-431.

Huang et al., "Dispersionless Phase Discontinuities for Controlling Light Propagation," Nano Letters, vol. 12, 2012, pp. 5750-5755.

Li et al., "Reflected Wavefront Manipulation Based on Ultrathin Planar Acoustic Metasurfaces," Scientific Reports, vol. 3, 2013, 6 pages.

Li et al., "Experimental Realization of Full Control of Reflected Waves with Subwavelength Acoustic Metasurfaces," Physical Review Applied, vol. 2, 2014, pp. 064002-1-064002-11.

Mei et al., "Controllable Transmission and Total Reflection Through an Impedance-Matched Acoustic Metasurface," New Journal of Physics, vol. 16, 2014, 11 pages.

Tang et al., "Anomalous Refraction of Airborne Sound Through Ultrathin Metasurfaces," Scientific Reports, vol. 4, 2014, 7 pages.

Yuan et al., "Conversion of Sound Radiation Pattern Via Gradient Acoustic Metasurface with Space-Coiling Structure," Applied Physics Express, vol. 8, No. 2, 2015, pp. 027301-1-027301-4.

Zhao et al., "Manipulating Acoustic Wavefront by Inhomogeneous Impedance and Steerable Extraordinary Reflection," Scientific Reports, vol. 3, 2013, 6 pages.

Zhao et al., "Redirection of Sound Waves Using Acoustic Metasurface," Applied Physics Letters, 103, 151604, 2013, 151604-1-151604-5.

Zhu et al., "Dispersionless Manipulation of Reflected Acoustic Wavefront by Subwavelength Corrugated Surface," Scientific Reports, vol. 5, 2015, 12 pages.

Tang et al., "Focusing and Direction Beaming Effects of Airborne Sound Through a Planar Lens with Zigzag Slits," Journal of Applied Physics, vol. 117, 2015, pp. 024503-1-024503-.4.

Li et al., "Metascreen-Based Acoustic Passive Phased Array," Physical Review Applied, vol. 4, 2015, pp. 024003-1-024003-7.

Yu et al., "Flat Optics with Designed Metasurfaces," Nature Materials, vol. 13., 2014, pp. 139-150.

Zhu et al., "Anomalous Refraction of Acoustic Guided Waves in Solids with Geometrically Tapered Metasurfaces," Physical Review Letters, vol. 117, Issue 3, 2016, pp. 034302-1-034302-6.

Liu et al., "Source Illusion Devices for Flexural Lamb Waves Using Elastic Metasurfaces," Physical Review Letters, vol. 119, Issue 3, 2017, pp. 034301-1-034301-6.

Li et al., "Tunable Modulation of Refracted Lamb Wave Front Facilitated by Adaptive Elastic Metasurfaces," Applied Physics Letters, vol. 112, 2018, pp. 021903-1-021903-5.

Su et al., "Elastic Metasurfaces for Splitting SV- and P-Waves in Elastic Solids," Journal of Applied Physics, vol. 123, 2018, pp. 091701-1-091701-9.

Lee et al., "Mass-Sliffness Substructuring of an Elastic Metasurface for Full Transmission Beam Steering," Journal of the Mechanics and Physics of Solids, vol. 112, 2018, pp. 577-593.

Xu et al., "Deflecting Rayleigh Surface Acoustic Waves by a Meta-Ridge with a Gradient Phase Shift," Journal of Physics D: Applied Physics, vol. 51, No. 17, 2018, 9 pages.

Shen et al., "Elastic Wave Manipulation by Using a Phase-Controlling Meta-Layer," Journal of Applied Physics, vol. 123, 2018, pp. 091708-1-091708-11.

Tol et al., "Self-Bending Elastic Waves and Obstacle Circumventing in Wireless Power Transfer," Applied Physics Letters, vol. 110, 2017, pp. 163505-1-163505-5.

Zhu et al., "Total-internal-reflection elastic metasurfaces: Design and application to structural vibration isolation", Applied Physics Letters 113 (2018), pp. 221903-1-221903-5.

\* cited by examiner

TOTAL-INTERNAL REFLECTION ELASTIC METASURFACES: DESIGN AND APPLICATION

STATEMENT OF GOVERNMENT INTEREST

This invention was made with Government support under Contract No. DE-NA0003525 awarded by the United States Department of Energy/National Nuclear Security Administration. The U.S. Government has certain rights in the invention.

BACKGROUND

1. Field

The disclosure relates generally to vibrational shielding and, more specifically, to an apparatus for blocking transmission of vibrational waves.

2. Description of the Related Art

Vibration is undesirable in many domains, primarily engineered systems and habitable spaces, and methods have been developed to prevent the transfer of vibration to such systems. Vibrations propagate via mechanical waves and certain mechanical linkages conduct vibrations more efficiently than others. Passive vibration isolation makes use of materials and mechanical linkages that absorb and damp these mechanical waves. Active vibration isolation involves sensors and actuators that produce disruptive interference that cancels-out incoming vibration. However, current systems for vibration isolation are often bulky and add significant weight or volume to a system. Furthermore, the success in reducing or eliminating acoustic vibrations of prior art systems in some applications is often limited.

Therefore, it would be desirable to have a method and apparatus that take into account at least some of the issues discussed above, as well as other possible issues.

SUMMARY

According to one embodiment of the present invention, an acoustic shield for protecting a vibrational sensitive device includes a first unit cell and a second unit cell. The first unit cell includes a first interface between a first and a second media with a first locally resonant unit embedded along the first interface, the first locally resonant unit controlling a first phase gradient, and the first unit cell comprising a first surface. The second unit cell includes a second surface proximate to the first surface. The second unit cell includes a second interface between a third media and a fourth media with a second locally resonant unit embedded along the second interface, and the second locally resonant unit controlling a second phase gradient. The first phase gradient is different from the second phase gradient. The first unit cell and the second unit cell comprise a super cell. The acoustic shield is configured such that a vibrational wave from a first side of the super cell to a second side of the super cell is substantially attenuated.

According to another embodiment of the present invention, an apparatus includes a vibrational sensitive device and a plurality of supercells positioned between a vibrational source and the vibrational sensitive device. The plurality of supercells are configured to substantially attenuate vibrational waves within a frequency band according to phase shifts determined according to a generalized Snell's law. Each supercell includes at least a first unit cell and a second unit cell. The first unit cell includes a first interface between a first and a second media with a first locally resonant unit embedded along the first interface. The first locally resonant unit controls a first phase gradient. The first unit cell also includes a first surface. The second unit cell includes a second surface proximate to the first surface of the first unit cell. The second unit cell includes a second interface between a third media and a fourth media with a second locally resonant unit embedded along the second interface. The second locally resonant unit controls a second phase gradient. The first phase gradient is different from the second phase gradient.

According to another embodiment of the present invention, an acoustic shield for protecting a vibrational sensitive device includes a plurality of unit cells each comprising a locally resonant unit controlling a respective phase gradient. Each phase gradient is different from every other phase gradient. A magnitude of each phase gradient is equal to an integer multiple of $2\pi$ divided by a total number of unit cells. Transmission of a vibrational wave from a first side of the plurality of unit cells to a second side of the plurality of unit cells is substantially attenuated.

DETAILED DESCRIPTION

Detailed embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive.

Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

For purposes of the description hereinafter, the terms "upper," "lower," "right," "left," "vertical," "horizontal," "top," "bottom," and derivatives thereof shall relate to the embodiments of the disclosure, as it is oriented in the drawing figures. The terms "positioned on" means that a first element, such as a first structure, is present on a second element, such as a second structure, wherein intervening elements, such as an interface structure, e.g. interface layer, may be present between the first element and the second element.

In this disclosure, when an element, such as a layer, region, or substrate is referred to as being "on" or "over" another element, the element can be directly on the other element or intervening elements can also be present.

In contrast, when an element is referred to as being "directly on," "directly over," or "on and in direct contact with" another element, there are no intervening elements present, and the element is in contact with another element.

The processes, steps, and structures described below do not form a complete process flow for acoustic metamaterials. Only so much of the commonly practiced process steps and structures are included as necessary for an understanding of the different examples of the present disclosure. The Figures represent cross sections of a portion of a TIS-MS and are not drawn to scale, but instead are drawn so as to illustrate different illustrative features of the disclosure.

As used herein, the phrase "at least one of", when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B and ten of item C; four of item B and seven of item C; or other suitable combinations.

As used herein, the terms "optimize", "optimization", and "optimizing" do not necessarily mean that the result is the very best possible result, but rather merely mean that an optimized value is a value the produces a desired result, the desired result possibly being a range of acceptable values or within a specified bound, or optimization may merely mean an improvement or change in a quality as compared with an unoptimized value. In an aspect, "optimizing" means tuning a variable such that a resulting property is within a range of acceptable resulting properties.

The illustrative embodiments recognize and take into account one or more different considerations. The illustrative embodiments further recognize that metasurfaces may be used as an acoustic shield capable of blocking the propagation of elastic waves in the host waveguide. The illustrative embodiments further recognize that total internal reflection metasurface (TIR-MS) can be used for the realization of structure-embedded subwavelength acoustic shields for elastic waves propagating in thin waveguides. The illustrative embodiments further recognize that the disclosed metasurface designs exploit extreme phase gradients, implemented via locally resonant elements, in order to achieve operating conditions that are largely beyond the critical angle. The illustrative embodiments further recognize that such artificial discontinuity is capable of producing complete reflection of the incoming waves regardless of the specific angle of incidence. The illustrative embodiments further recognize that the TIR-MS behaves as a sound hard barrier that is impenetrable to long-wavelength modes at a selected frequency.

The concept of metasurface has recently emerged as a powerful approach to achieve compact and subwavelength devices for wave manipulation. The fundamental idea was first pioneered in optics and later extended to acoustics. At the basis of the metasurface design lies the concept of Generalized Snell's Law (GSL) that allows predicting the anomalous refraction across interfaces characterized by a phase gradient. Metasurfaces are rather versatile objects given the variety of phase shift profiles that can be encoded and that lead to remarkable and unconventional wave manipulation effects. A few examples include bending wave fields (either light or sound) in arbitrary shapes, converting propagating into surface modes, and designing ultra-thin lenses. Only very recently, this concept was extended for application to elastodynamics in order to control the refraction of elastic waves in solid waveguides.

In traditional problems of wave transmission across an interface between dissimilar materials, both the angles of reflection and refraction are controlled by either the angle of incidence of the incoming wave or by the impedance mismatch between the two materials. For a given material selection, it is well-known that upon increasing the angle of incidence of the incoming wave a condition will be reached in which the wave cannot propagate into the second material (i.e. no refracted wave solution can exist). This threshold value of the incident angle is referred to as critical angle. Typically, at the first critical angle the angle of refraction is 90°, therefore the wave travels along the interface with no transmission into the second material. If the angle of incidence is further increased beyond the critical value, the wave is entirely reflected into the same half space giving rise to a phenomenon known as total internal reflection (TIR). In analogy with this classical behavior of wave propagation through an interface, we highlight that also a metasurface can achieve critical angle conditions.

Disclosed herein are structure-embedded subwavelength acoustic shields for elastic waves propagating in thin waveguides using Total Internal Reflection metasurface (TIR-MS). The disclosed metasurface design exploits extreme phase gradients, implemented via locally resonant elements, in order to achieve operating conditions that are largely beyond the critical angle. Such artificial discontinuity is capable of producing complete reflection of the incoming waves regardless of the specific angle of incidence. In an embodiment, the TIR-MS behaves as a sound hard barrier that is impenetrable to long-wavelength modes at a selected frequency. In an embodiment, the TIR metasurface is a flat interface embedded in a rectangular waveguide and designed to block flexural $A_0$-type guided modes. In other embodiments, the TIR-MS is a circular plate. A TIR-MS in a circular plate allows an enclosed area to be effectively shielded from incoming waves. In various embodiments, significant vibration isolation can be achieved under any arbitrary incidence angle when the metasurface is excited at the target frequency. Such results open new interesting paths to achieve vibration isolation and energy filtering in certain prototypical structures of interest for practical engineering applications.

Disclosed herein are elastic metasurface that are explicitly designed to operate in the TIR regime. Such design is particularly interesting because it provides a fully passive approach to embedded subwavelength sound-hard barriers capable of blocking the propagation of elastic waves in the host waveguide. It is anticipated that this effect could be exploited in a variety of devices such as, for example, structural notch filters or, more in general, to achieve vibration isolation and control.

Figure 1:
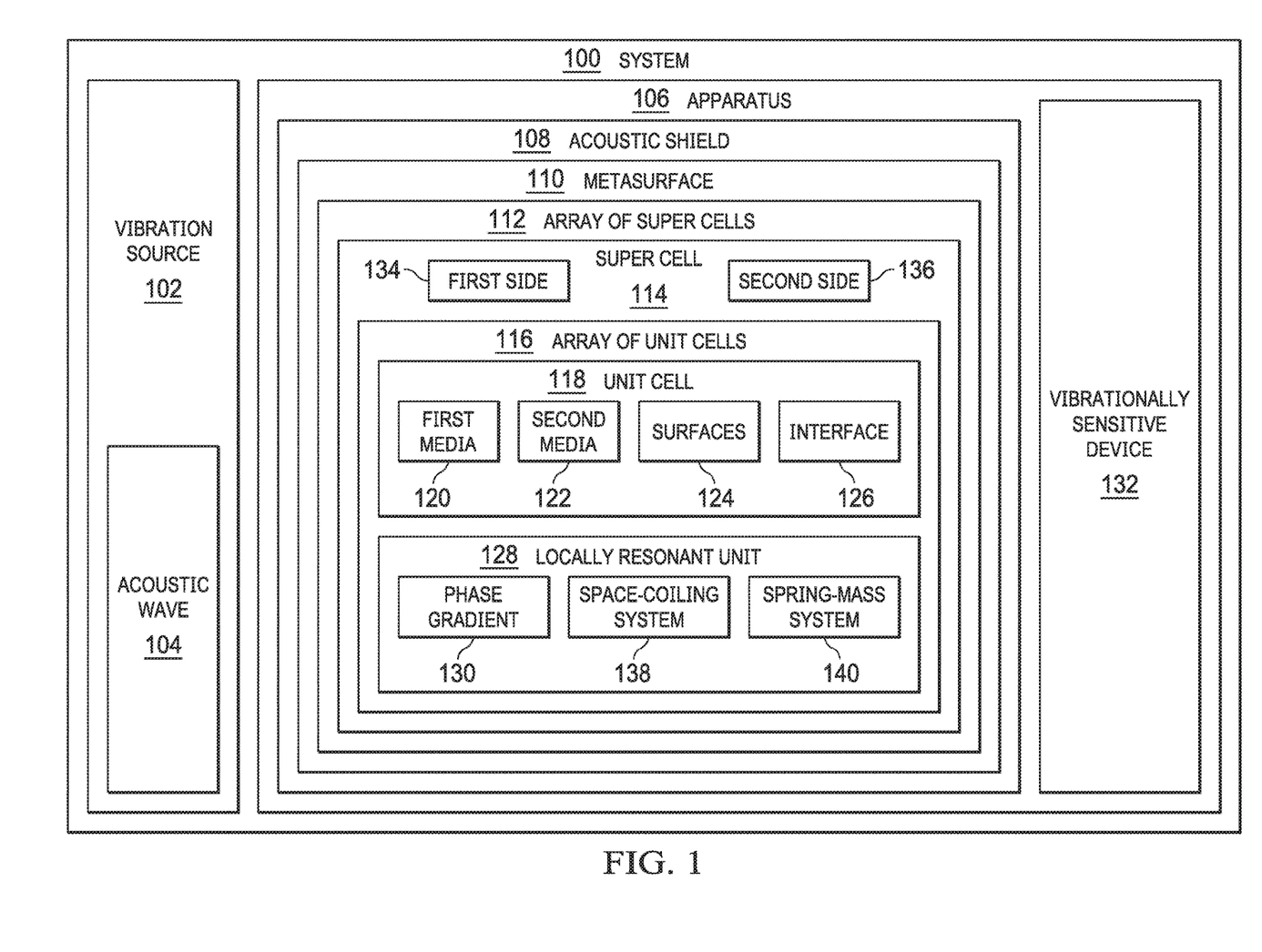
FIG. 1 is a block diagram of a system for protecting a vibrational sensitive device from a vibration source in accordance with an illustrative embodiment.

With reference now to the figures and, in particular, with reference to FIG. 1, a block diagram of a system for protecting a vibrational sensitive device from a vibration source is depicted in accordance with an illustrative embodiment. System 100 includes an apparatus 106 that includes a vibrationally sensitive device 132 and an acoustic shield 108 protecting the vibrationally sensitive device 132 from a number of acoustic waves 104 from a number of vibration sources 102. Vibrationally sensitive device may be a mechanical device, an electronic device, or any other device, apparatus, component, or material that requires vibrational isolation from at least some frequencies of acoustic vibration. In an embodiment, acoustic shield 108 is an elastic waveguide.

Acoustic shield 108 acts as a sound-hard barrier blocking the propagation of a number of acoustic waves 104. In an embodiment, acoustic shield 108 completely blocks acoustic wave 104. In other embodiments, acoustic shield 108 blocks a substantial portion of acoustic wave 104 such that an insignificant amount of acoustic wave 104 is transmitted to vibrationally sensitive device 132. In other words, acoustic shield 108 substantially attenuates transmission of acoustic wave 104 to vibrationally sensitive device 132. In an embodiment, substantially attenuating transmission of acoustic wave 104 means attenuating transmission of acoustic wave 104 such that the amplitude of acoustic wave 104 arriving at vibrationally sensitive device 132 is lower than a threshold amplitude. In an embodiment, the threshold amplitude is a 90%, 95%, or 99% reduction of the initial amplitude of acoustic wave 104. The threshold is implementation dependent and may be determined based on the requirements of vibrationally sensitive device 132.

Acoustic shield 108 includes a metasurface 110 that includes an array of super cells 112. Array of super cells 112 includes at least one super cell 114. Super cell 114 includes an array of unit cells 116 and, in an embodiment includes at least a first unit cell, such as unit cell 118, and a second unit cell, such as unit cell 118. Each unit cell 118 includes an interface 126 between a first media 120 and a second media 122 with locally resonant unit 128 embedded along interface 126. Locally resonant unit 128 controls a phase gradient 130. Unit cell 118 includes a number of surfaces 124. The unit cells 118 are arranged in the super cell 114 such that a first surface of number of surfaces 124 is proximate to a second surface of number of surfaces 124 in a neighboring unit cell 118. The phase gradient of each unit cell 118 within a super cell 114 are different. Transmission of acoustic wave 104 wave from a first side 134 of the super cell 114 to a second side 136 of super cell 114 is substantially attenuated. Acoustic wave 104 may also be referred to as a vibrational wave and the two terms are used interchangeably throughout this disclosure.

In an embodiment, the phase gradients 130 of each unit cell 118 array of unit cells 116 are configured to provide total internal reflection of a vibrational wave within a frequency bandwidth. In an embodiment, the phase gradients 130 of each unit cell 118 array of unit cells 116 are configured to provide total internal reflection of a vibrational wave within a frequency bandwidth according to a generalized Snell's law. Generalized Snell's law is discussed in greater detail below. In an embodiment, phase gradient 130 is an integer multiple of 2n divided by a total number of unit cells 118 in the super cell 114.

In an embodiment, first media 120 and second media 120 are each a rectangular block connected to locally resonant unit 128. In an embodiment, the locally resonant unit 128 is one of a space-coiling system 138 or a spring-mass system 140.

In some embodiments, the first media 120 and second media 120 are constructed from the same material. In some embodiments, locally resonant unit 128 is constructed from the same material as one or both of first media 120 and second media 122. In other embodiments, first media 120 and second media 122 are constructed from different materials such that first media 120 is constructed from a first material, second media is constructed from a second material, and the locally resonant unit 128 is constructed from a third material where the third material is different from both the first material and the second material. In an illustrative embodiment, each of the first, second, and third materials are one of tungsten and aluminum.

The number of unit cells 118 within super cell 114 may be two or more. The array of super cells 112 may be arrange in a surface of any shape including a plane, a sphere or some more complex shape.

Figure 2:
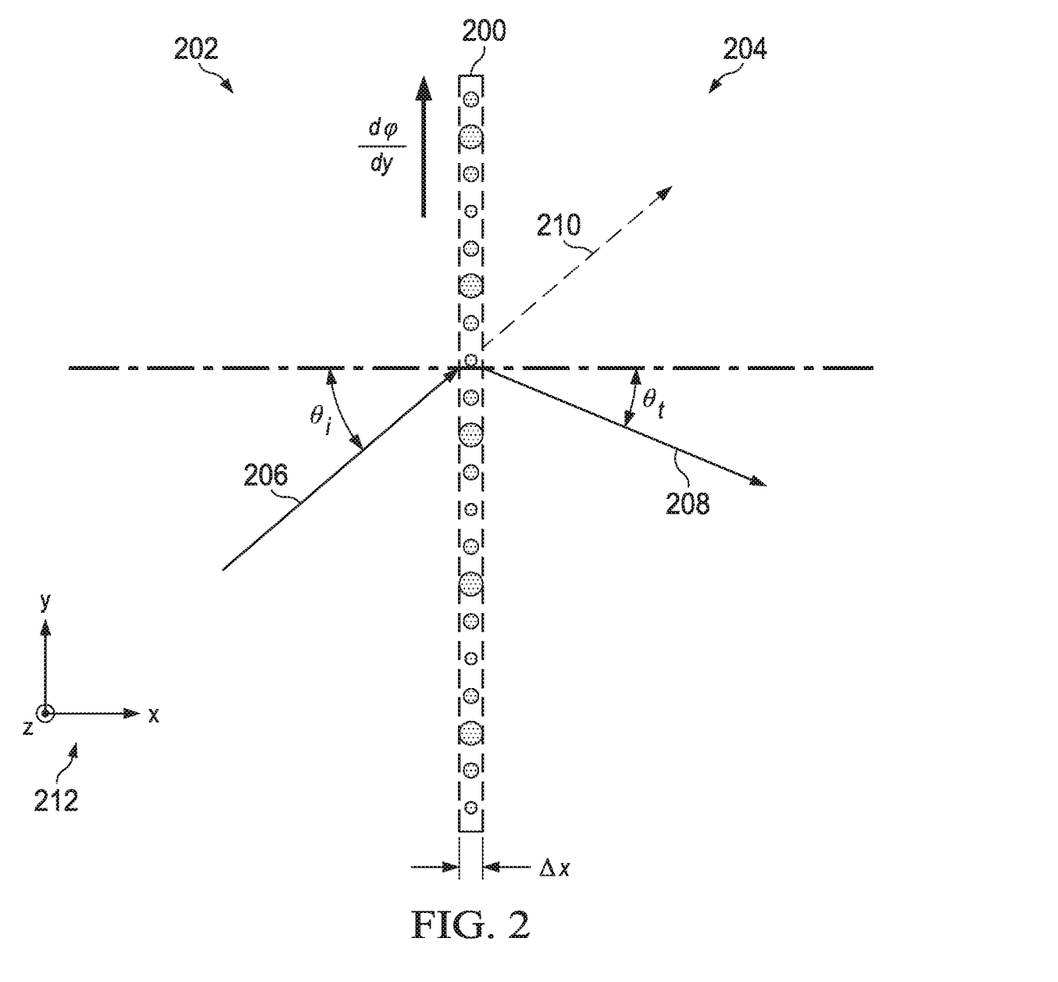
FIG. 2 shows a schematic view of an elastic waveguide with an embedded metasurface according to an illustrative embodiment.

Turning now to an explanation of principles of acoustic shielding, FIG. 2 shows a schematic view of an elastic waveguide with an embedded metasurface according to an illustrative embodiment. The schematic view shows an incoming acoustic wave represented by arrow 206 impacting elastic waveguide 200 traveling from a first side 202 of the elastic waveguide 202 and refracted through to a second side 204 of elastic waveguide 200. Refracted acoustic wave is represented by arrow 208 and the dashed arrow 210 represents the direction the acoustic wave would travel if not refracted by elastic waveguide 200. Elastic waveguide 200 has a thickness of Δx. The orientation of the coordinate system 212 is shown. Fundamental quantities such as the angle of incidence $\theta_i$, the angle of refraction $\theta_t$, and the phase gradient $$\frac{d\phi}{dy}$$

are also shown.

According to the Generalized Snell's Law (GSL), when an interface between two (either identical or different) media is encoded with a phase gradient dφ/dy, the direction of the refracted beam θt can be related to the incident angle θi as follows:

$$\frac{\sin(\theta_t)}{\lambda_t} - \frac{\sin(\theta_i)}{\lambda_i} = \frac{1}{2\pi}\frac{d\phi}{dy} \quad (1)$$

Equation (1) implies that, even when the two media are exactly identical ($\lambda_i=\lambda_t$), the direction of the refracted beam can be conveniently controlled by properly embedding a constant phase-gradient (dφ/dy) along the direction of the interface. Given that in order to achieve propagating conditions across the interface (i.e. real-valued wave numbers $k_t=2\pi/\lambda_t$) it must be $-1<\sin(\theta_t)<1$, any choice of the phase gradient that violates this condition will result in total internal reflection. Substituting this condition into Eq. (1), we obtain that in order to achieve TIR the phase gradient must satisfy the inequality $$\frac{d\phi}{dy} \geq \frac{4\pi}{\lambda}.$$

To achieve subwavelength control on the phase gradient, the metasurface employs locally resonant units [20] that are specifically tuned to provide a transfer function yielding the required phase shift along the interface direction. Note that each resonating unit provides a prescribed and constant change in phase, so the gradient $d\phi/dy$ is effectively discretized as a step-like function along the interface. Note that, not only the phase but also amplitude of the transfer function of the resonant unit plays an important role in determining the overall wave control because it determines the local magnitude of the reflected wave front and, hence, its homogeneity.

Previous studies on "transparent" metasurfaces (i.e. those interfaces designed to transmit waves at selected angles of refraction) showed that the amplitude of the transfer function of the different units forming the interface should be as large as possible and comparable with each other in order to preserve a constant wave amplitude along the wave front. Similarly, in TIR metasurfaces the amplitude of the transfer function should be uniform across different units and as low as possible in order to achieve an opaque or fully reflective interface.

Figure 3A:
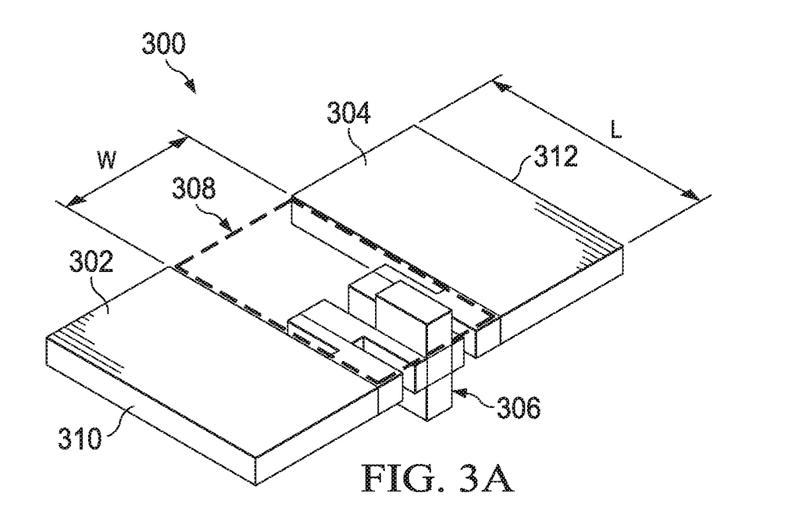
FIGS. 3A-3C show three individual unit cells for use in an acoustic shield are shown in accordance with illustrative embodiments.
Figure 3B:
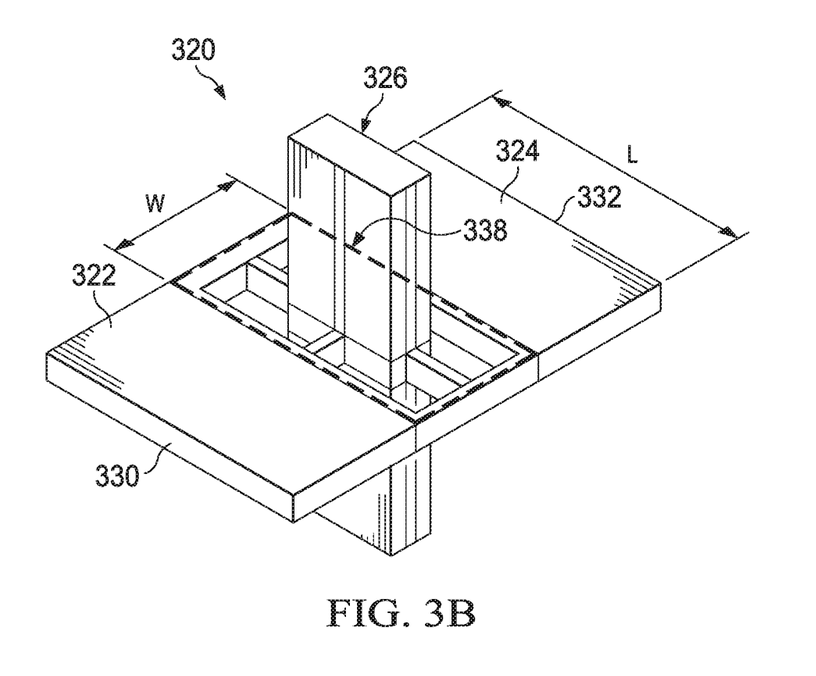
Figure 3C:
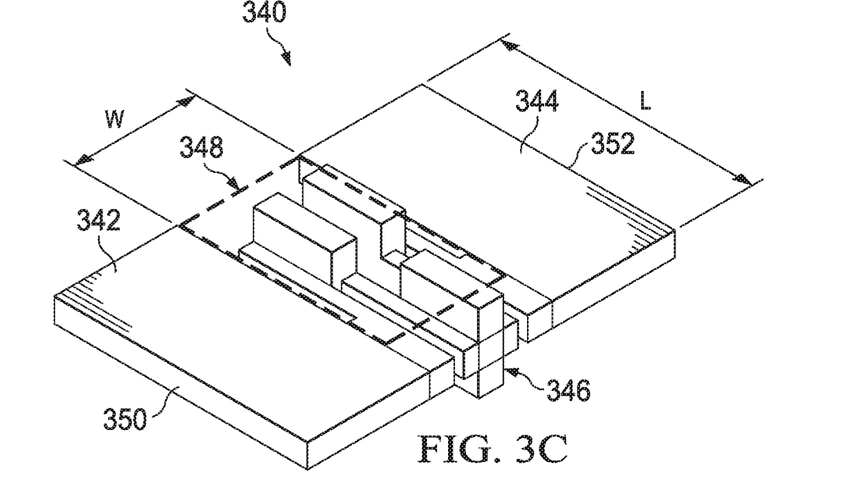

Turning now to FIGS. 3A-3C, three individual unit cells for use in an acoustic shield are shown in accordance with an illustrative embodiment.

FIG. 3A is a first unit cell with a first phase gradient. First unit cell 300 includes first media 302, second media 304, and locally resonant unit 306 embedded in interface 308 between first media 302 and second media 304. In an embodiment, interface 308 is rectangular in shape having a width, W, and a length, L, as shown. The first unit cell 320 has a first surface 310 and a second surface 312. Locally resonant unit 306 is configured to resonate in interface 308. Portions of interface 308 not occupied by locally resonant unit 306 may be filled with a gas, a liquid, a solid, or with a vacuum. The size, shape, and orientation of locally resonant unit 306 are determined according to a desired phase shift of locally resonant unit 306.

FIG. 3B is a second unit cell with a first phase gradient. Second unit cell 320 includes first media 322, second media 324, and locally resonant unit 326 embedded in interface 328 between first media 322 and second media 324. In an embodiment, interface 238 is rectangular in shape having a width, W, and a length, L, as shown. The second unit cell 320 has a first surface 330 and a second surface 332. Locally resonant unit 326 is configured to resonate in interface 328. Portions of interface 328 not occupied by locally resonant unit 326 may be filled with a gas, a liquid, a solid, or with a vacuum. The size, shape, and orientation of locally resonant unit 326 are determined according to a desired phase shift of locally resonant unit 326. The phase shift of second unit cell 320 is different from the phase shift of the first unit cell 300.

FIG. 3C is a third unit cell with a first phase gradient. Third unit cell 340 includes first media 342, second media 344, and locally resonant unit 346 embedded in interface 348 between first media 342 and second media 344. In an embodiment, interface 348 is rectangular in shape having a width, W, and a length, L, as shown. The third unit cell 340 has a first surface 350 and a second surface 352. Locally resonant unit 346 is configured to resonate in interface 348. Portions of interface 348 not occupied by locally resonant unit 346 may be filled with a gas, a liquid, a solid, or with a vacuum. The size, shape, and orientation of locally resonant unit 346 are determined according to a desired phase shift of locally resonant unit 346. The phase shift of third unit cell 340 is different from the phase shift of both the first unit cell 300 the second unit cell 320. In an embodiment, the phase shift of the first unit cell 300 is 0°, the phase shift of the second unit cell 320 is 120° and the phase shift of the third unit cell 340 is 240°.

The unit cells may be arranged linearly together to form a super cell. In an embodiment, the second surface 312 of the first unit cell 300 is proximate to the first surface 330 of the second unit cell 320 and the second surface 332 of the second unit cell 320 is proximate to the first surface 350 of the third unit cell 340. In various embodiments, the surfaces 312 and 330 are in physical contact and the surfaces 332 and 350 are in physical contact.

An array of super cells composed of the three unit cells 300, 320, 340 forms an acoustic shield, such as, for example, acoustic shield 108 in FIG. 1. Each super cell may be configured such that the second surface 352 of a first super cell is in contact with the first surface 310 of the adjacent super cell. In an embodiment, the array of super cells is a linear structure. In another embodiment, the array of super cells is a circular structure. Parallel lines of super cells arrays may be connected to form a sheet of super cells wherein the sheet of super cells is an acoustic shield. The sheet of super cells may be curved into any shape desired. For example, the sheet may be formed as a cylinder or a sphere or some other more complex shape.

The unit cells 300, 320, 340 are designed based on either a space-coiling or a spring-mass approach and employ different materials. For example, in one embodiment, the first media 302, 322, 342 and the second media 304, 324, 344 are tungsten and the locally resonant units 306, 326 346 are aluminum in order to achieve the desired transfer function, while maintaining a compact design.

In an embodiment, the interface 308, 328, 348 has dimensions of width, W, =40 millimeters (mm), length, L, =80 mm and a thickness, T, of 8 mm. In an embodiment, the locally resonant units 306, 326, 346 are designed either according to the idea of space-coiling or of a simple spring-mass system. It is worth noting that, in an embodiment, both add-on masses and dissimilar materials are employed in order to tune the resonance while maintaining a compact design.

Although, the example depicted is a super cell formed from three unit cells, a super cell may be formed by any number of unit cells from two to as many as desired. When three unit cells are utilized for a super cell, the phase shifts are selected to be integer multiples of $2\pi$ divided by three (i.e., the total number of unit cells). In an embodiment, in general, the phase shift of each unit cell is selected to be integer multiples of $2\pi$ divided by a total number of unit cells in the super cell.

Figure 4:
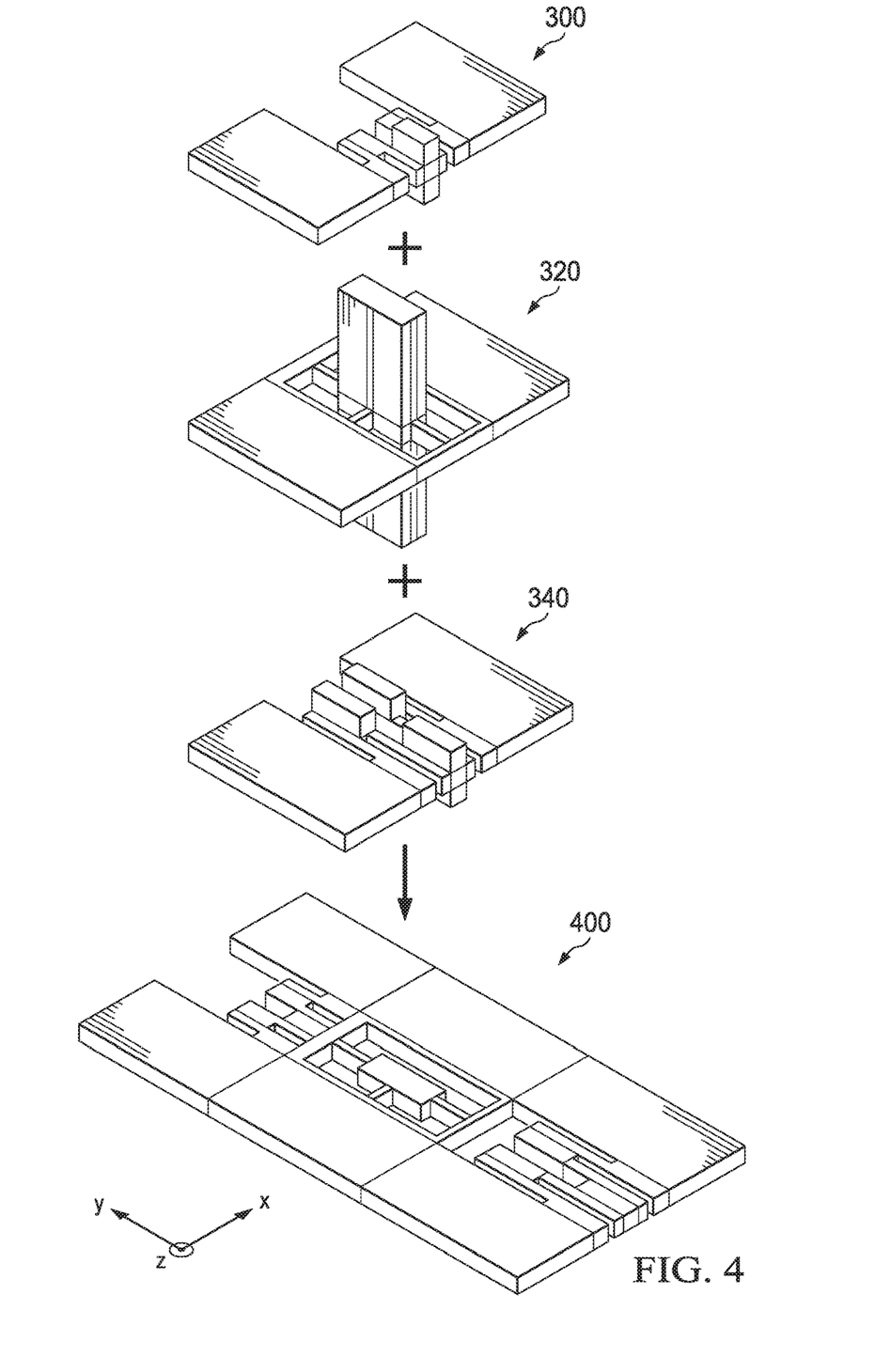
FIG. 4 is a super cell composed of three unit cells in accordance with an illustrative embodiment.

FIG. 4 illustrates a super cell composed of three unit cells in accordance with an illustrative embodiment. Super cell 400 is composed of the three unit cells 320, 340, 360 arranged linearly as shown and as described above.

Figure 5:
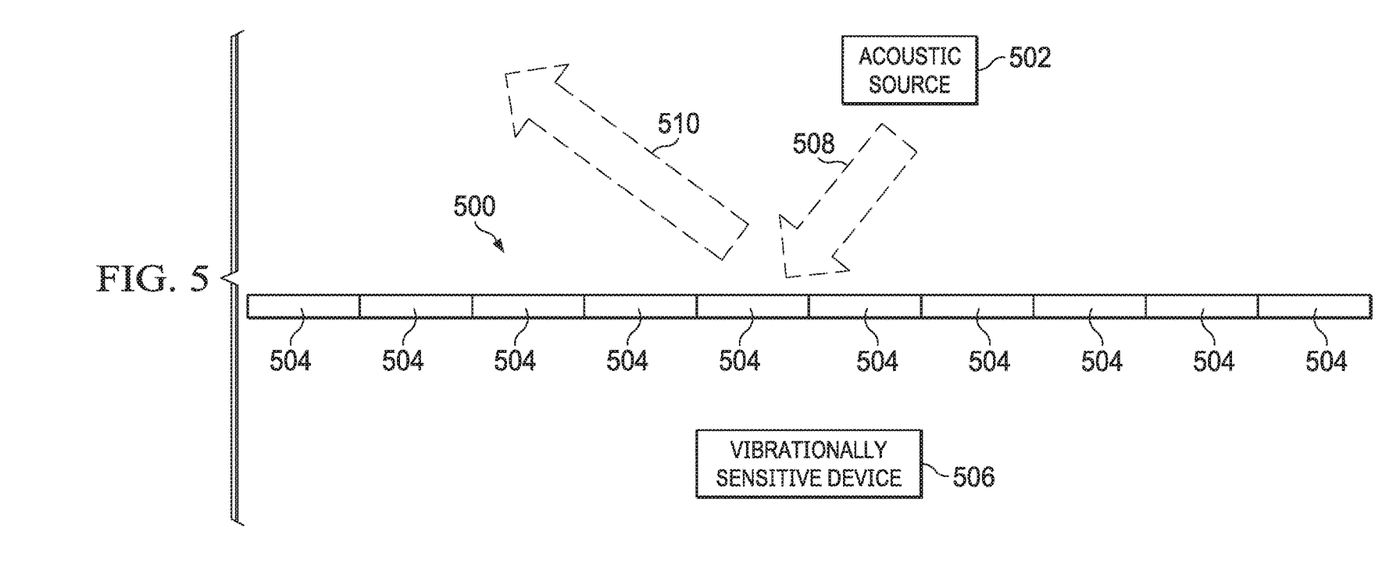
FIG. 5 is a diagram illustrating protection of a vibrationally sensitive device from an acoustic source by an acoustic shield in accordance with an illustrative embodiment.

FIG. 5 is a diagram illustrating protection of a vibrationally sensitive device from an acoustic source by an acoustic shield in accordance with an illustrative embodiment. As shown, acoustic shield 500 includes an array of super cells 504, such as super cell 400. In this example, the super cells 504 are arranged in a liner manner. The acoustic source 502 is situated on one side of the acoustic shield 500 and the vibrationally sensitive device 506 is situated on the other side of the acoustic shield 500. Acoustic waves 508 (vibrational energy) generated by acoustic source 502 is directed at the acoustic shield 500 as shown. However, rather than transmit the acoustic waves 508 through to the vibrational sensitive device 506, acoustic waves 508 are reflected back out as indicated by arrow 510.

Figure 6:
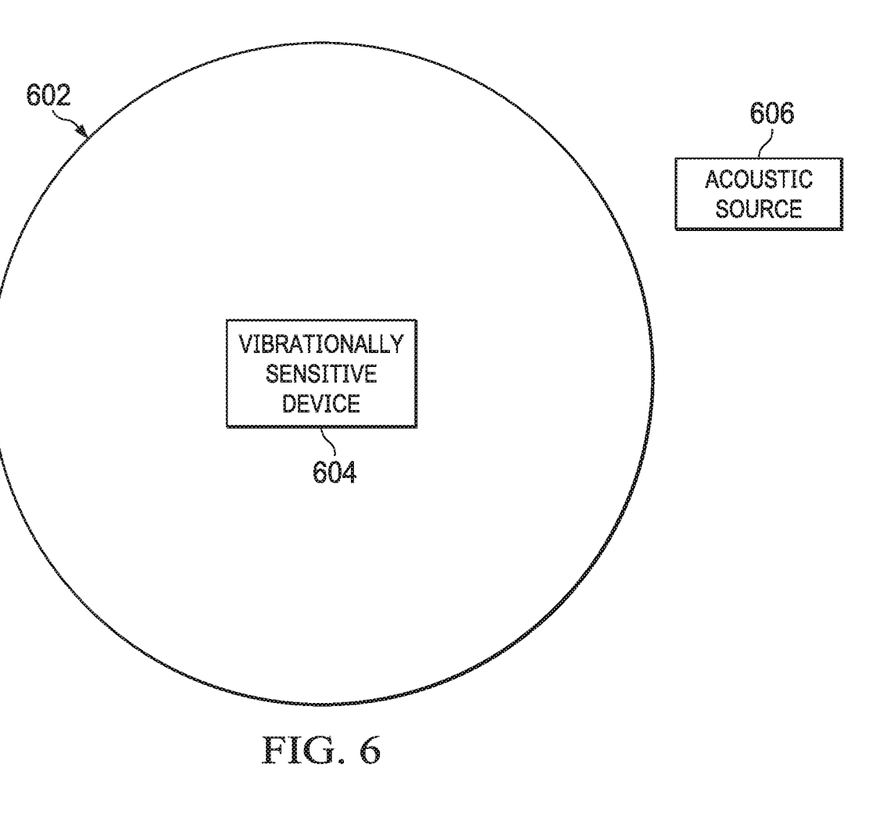
FIG. 6 shows an acoustic shield in accordance with an illustrative embodiment.

FIG. 6 shows an acoustic shield in accordance with an illustrative embodiment. Acoustic shield 602 is formed as a circular shape and surrounds a vibrationally sensitive device 604 protecting the vibrationally sensitive device 604 from an acoustic source 606. Although depicted as protecting a vibrational sensitive device, in other embodiments, the interior surrounded by the acoustic shield 602 may comprise an acoustic source 606 and the acoustic shield 602 inhibits the acoustic waves traveling beyond the acoustic shield 602.

Figure 7:
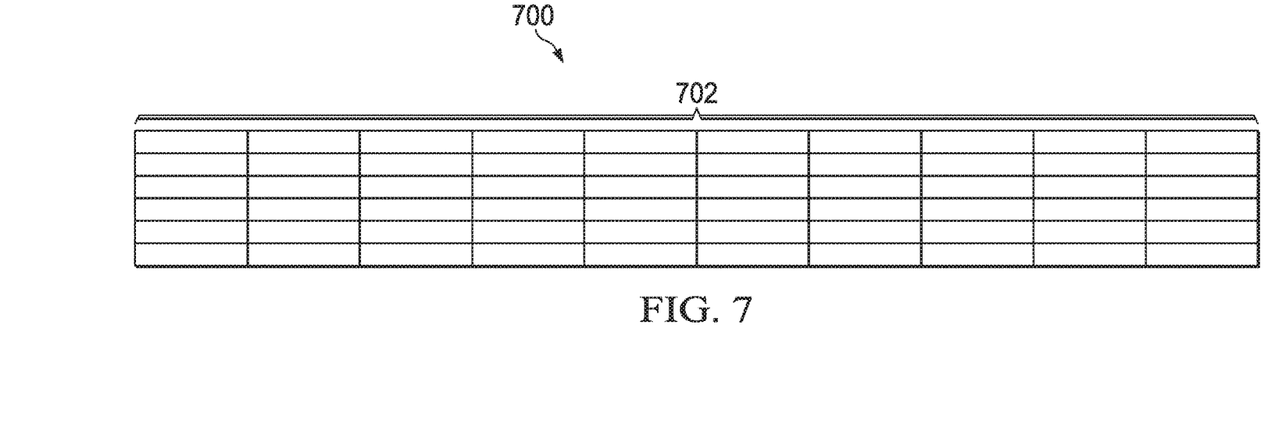
FIG. 7 shows an acoustic shield in accordance with an illustrative embodiment.

FIG. 7 shows an acoustic shield in accordance with an illustrative embodiment. Acoustic shield 700 includes a plurality of super cells 702, such as super cell 400. The super cells 702 are arranged in a planar sheet. In various embodiments, the planar sheet may be folded are curved into various shapes including a cylinder and a sphere.

Figure 8:
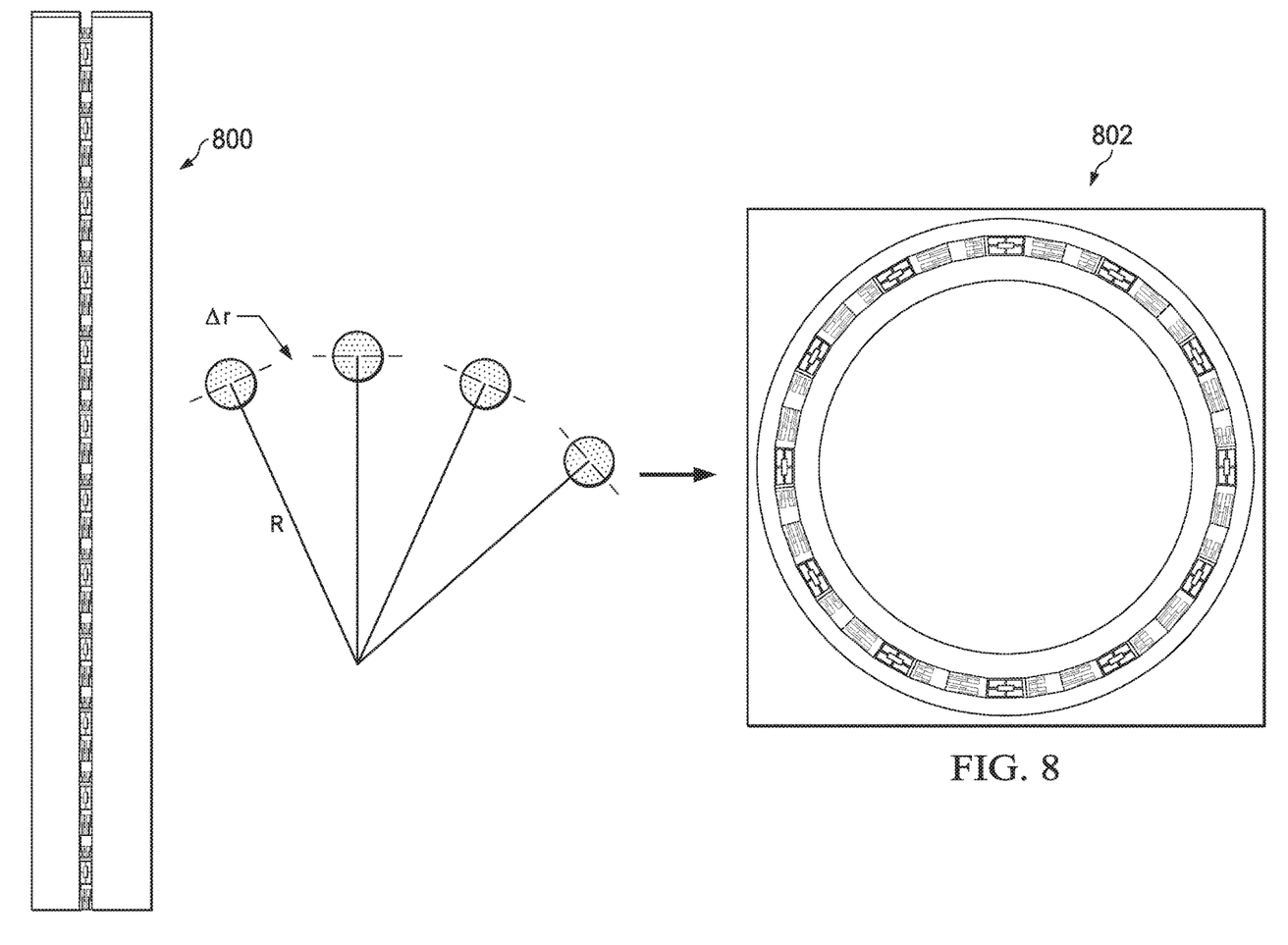
FIG. 8 is a conceptual schematic illustrating how the flat metasurface design could be adapted to create enclosed areas that are effectively shielded from unwanted mechanical energy.

FIG. 8 is a conceptual schematic illustrating how the flat metasurface design could be adapted to create enclosed areas that are effectively shielded from unwanted mechanical energy. The flat metasurface 800 may be, for example, acoustic shield 108. The flat metasurface 800 may be curved to form an enclosed shield 802 as shown.

In some alternative implementations of an illustrative embodiment, the function or functions noted in the blocks may occur out of the order noted in the figure. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The illustrative embodiments of acoustic shields provide for total internal reflection elastic metasurface (TIR-MS) which is capable of highly subwavelength dynamic isolation. The TIR-MS relies on the existence of critical phase shift gradients which guarantee that incident wave fronts at any arbitrary angle cannot be transmitted in the region downstream of the engineered interface. The specific metasurface design employs locally resonant units capable of achieving large phase shifts covering the whole $2\pi$ range under highly subwavelength conditions. Effective wave control was shown first numerically and then experimentally on different thin elastic waveguides. While traditional metasurfaces are typically designed to be transparent and refract waves in a controlled manner, the TIR-MS is designed to be opaque or, ideally, fully reflective. Results show that TIR-MS is particularly well suited for blocking the propagation of wave fronts with an arbitrary angle of incidence and at a selected frequency. This aspect of the TIR-MS is considered particularly convenient to create highly subwavelength vibration isolation while preserving the structural role of the host system. Given the narrow band characteristic of the resonant metasurface design, it is expected that the TIR-MS could also be employed as an analog notch filter to block a selected frequency.

The structures that have been described above with reference to figures in the different examples may be employed in any number of applications. For example, the acoustic shields disclosed herein may be used to shield sensitive electronics, accelerometers, and data recorders by blocking damaging shocks and vibrations or undesired frequencies. Acoustic shielding as disclosed herein may be used as acoustic insulation for internal noise damping.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. An acoustic shield for protecting a vibrational sensitive device, comprising:
a first unit cell comprising a first interface between a first and a second media with a first locally resonant unit embedded along the first interface, the first locally resonant unit controlling a first phase gradient, and the first unit cell comprising a first surface; and
a second unit cell comprising a second surface proximate to the first surface, the second unit cell comprising a second interface between a third media and a fourth media with a second locally resonant unit embedded along the second interface, and the second locally resonant unit controlling a second phase gradient,
wherein the first phase gradient is different from the second phase gradient,
wherein the first unit cell and the second unit cell comprise a super cell, and
wherein transmission of a vibrational wave from a first side of the super cell to a second side of the super cell is substantially attenuated.

2. The acoustic shield of claim 1, wherein phase gradients of the first and the second unit cells are configured to provide total internal reflection of a vibrational wave within a frequency bandwidth.

3. The acoustic shield of claim 1, wherein phase gradients of the first and the second unit cells are configured to provide total internal reflection of a vibrational wave within a frequency bandwidth according to a generalized Snell's law.

4. The acoustic shield of claim 3, wherein the first locally resonant unit comprises one of a space-coiling or a spring-mass system.

5. The acoustic shield of claim 1, wherein the first and second media comprise a rectangular block connected to the first locally resonant unit.

6. The acoustic shield of claim 1, wherein the first and second media comprise a same material.

7. The acoustic shield of claim 1, wherein the first media comprises a first material, the second media comprises a second material, and the first locally resonant unit comprises a third material, and wherein the third material is different from the first material and the second material.

8. The acoustic shield of claim 7, wherein the first material comprises one of tungsten and aluminum, wherein the second material comprises one of tungsten and aluminum, and wherein the third material comprises one of tungsten and aluminum.

9. The acoustic shield of claim 1, wherein the first phase shift comprises an integer multiple of $2\pi$ divided by a total number of unit cells in the super cell.

10. An apparatus, comprising:
a vibrational sensitive device; and
a plurality of supercells positioned between a vibrational source and the vibrational sensitive device, the plurality of supercells substantially attenuating vibrational waves within a frequency band according to phase shifts determined according to a generalized Snell's law, wherein each supercell comprises at least a first unit cell and a second unit cell,
wherein the first unit cell comprises a first interface between a first and a second media with a first locally resonant unit embedded along the first interface, the first locally resonant unit controlling a first phase gradient, and the first unit cell comprising a first surface,
wherein the second unit cell comprises a second surface proximate to the first surface, the second unit cell comprising a second interface between a third media and a fourth media with a second locally resonant unit embedded along the second interface, and the second locally resonant unit controlling a second phase gradient, and
wherein the first phase gradient is different from the second phase gradient.

11. The apparatus of claim 10, wherein phase gradients of the first and the second unit cells are configured to provide total internal reflection of a vibrational wave within a frequency bandwidth.

12. The apparatus of claim 10, wherein the first and second media comprise a rectangular block connected to the first locally resonant unit.

13. The apparatus of claim 12, wherein the first locally resonant unit comprises one of a space-coiling or a spring-mass system.

14. The apparatus of claim 10, wherein the first and second media comprise a same material.

15. The apparatus of claim 10, wherein the first media comprises a first material, the second media comprises a second material, and the first locally resonant unit comprises a third material, and wherein the third material is different from the first material and the second material.

16. The apparatus of claim 15, wherein the first material comprises one of tungsten and aluminum, wherein the second material comprises one of tungsten and aluminum, and wherein the third material comprises one of tungsten and aluminum.

17. The apparatus of claim 10, wherein the plurality of supercells comprise a cylinder surrounding the vibrational sensitive device.

18. The apparatus of claim 10, wherein the plurality of supercells comprise a sphere surrounding the vibrational sensitive device.

19. The apparatus of claim 10, wherein the plurality of supercells comprise a three dimensional surface at least partially separating the vibrational sensitive device from a vibrational source.

20. An acoustic shield for protecting a vibrational sensitive device, comprising:
a plurality of unit cells each comprising a locally resonant unit controlling a respective phase gradient,
wherein each phase gradient is different from every other phase gradient,
wherein a magnitude of each phase gradient is equal to an integer multiple of $2\pi$ divided by a total number of unit cells, and
wherein transmission of a vibrational wave from a first side of the plurality of unit cells to a second side of the plurality of unit cells is substantially attenuated.

\* \* \* \* \*